United States Patent [19]

Freeman

[11] 3,862,592
[45] Jan. 28, 1975

[54] BALE FORMING AND TYING MECHANISM

[76] Inventor: Percy F. Freeman, 2034 N.W. 27th Ave., Portland, Oreg.

[22] Filed: Apr. 30, 1973

[21] Appl. No.: 355,645

[52] U.S. Cl............................ 100/4, 100/21, 100/31
[51] Int. Cl.............................................. B65b 13/28
[58] Field of Search......... 100/17, 18, 19, 19 A, 20, 100/21, 22, 23, 24, 31, 4

[56] References Cited
UNITED STATES PATENTS
2,649,043  8/1953  Jones et al. ..................... 100/21 X

*Primary Examiner*—Billy J. Wilhite
*Attorney, Agent, or Firm*—Eugene M. Eckelman

[57] ABSTRACT

A baler having a baling chamber and a compacting piston for forming bales in end to end relation through the chamber. A supply source of wire is provided and a wire carrying needle is operative by power driven means to move up and down at intervals through the baling chamber. Wire tying means are associated with the needle for tying the wire after a bale has been completed. The needle is of a length and has a necessary movement above the baling chamber to leave a loop of wire above the chamber of a length equivalent to substantially the length of a bale in order that as the bale is formed, the wire along the top of the bale is fed from the loop. Wire does not therefore have to be pulled between tightly compressed bale portions. This function is accomplished by a latch and reset assembly operated by tension from the wire after the loop has been depleted.

6 Claims, 7 Drawing Figures

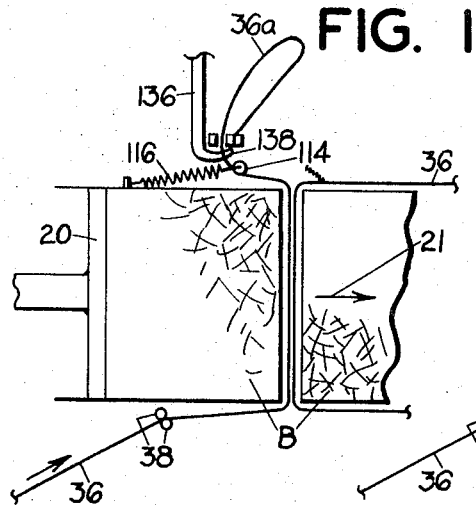
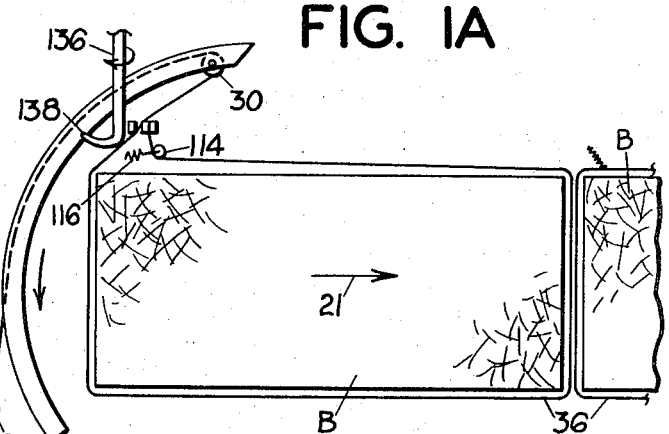
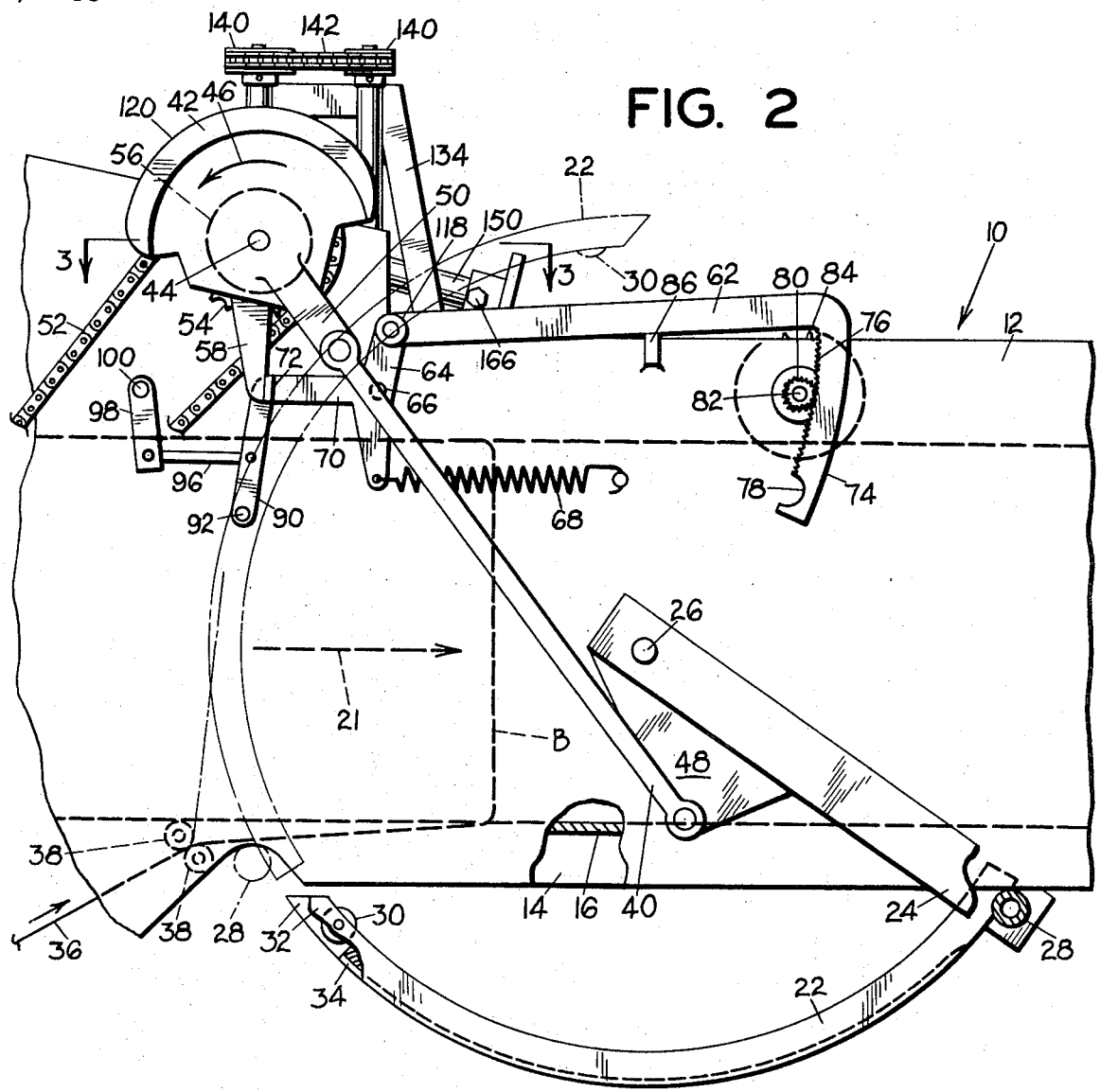

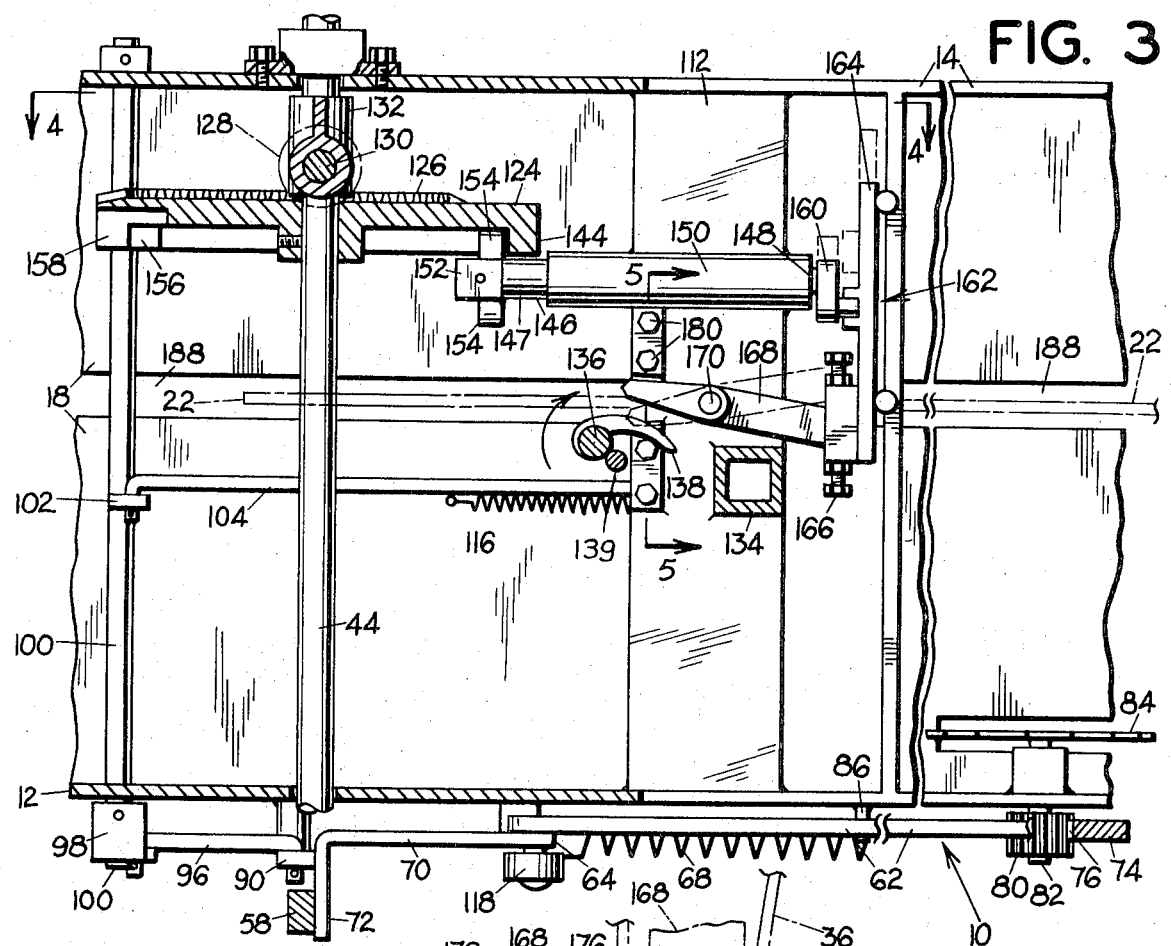

3,862,592

BALE FORMING AND TYING MECHANISM

BACKGROUND OF THE INVENTION

This invention relates to new and useful improvements in bale forming and tying mechanisms and particularly pertains to wire feed and control means for such mechanisms.

In the numerous types of balers heretofore utilized, wire is fed from a source on one side, such as the bottom, and as the bale is formed the wire strips out from the source. In the usual structure, the bales are moved through a baling chamber in end to end relation, and the wire must extend from the source along exposed surfaces of the bales and between the bales. The area between the bales of course is compressed very tight and the wire will often break because it cannot slide between the bale being formed and the preceding bale. Balers heretofore used thus could not tie extremely tight bales and in order to make such a tight bale, which of course is desirable for space purposes in storage and for handling, it has been necessary to hand tie them or to provide a complex mechanism which feeds from both sides.

SUMMARY OF THE INVENTION

According to the present invention and forming a primary objective thereof, a bale forming and tying mechanism is provided which amounts to a substantial improvement over the art in that it has means for mechanically tying tight bales and furthermore in that it does not require a complexity of opposite feeding means.

More particular objects of the invention are to provide a bale forming and tying mechanism which utilizes a length of wire supplied to one side of the bale for determining the length of the bale, such length of wire when used up causing to actuate power driven means for the wire feeding needle and for the wire tying and cutting means; to provide such a mechanism of a novel arrangement employing a needle which has a movement and a length capable of forming an excess loop of wire on the side of the bale opposite from the source of supply to provide the length of wire which determines the length of the bale, whereby, as the bale is formed, the wire on the loop side does not have to be pulled through the compressed area between a pair of bales; to provide a latch member actuated by a pull of the wire in a novel manner as it is substantially fully taken up on one side of the bale; and to provide a novel reset mechanism which cooperates with the latch member for providing predetermined operation of said power driven means.

The invention will be better understood and additional objects and advantages will become apparent from the following description taken in connection with the accompanying drawings:

BRIEF DESCRIPTION OF THE DRAWINGS

FIGS. 1, 1A and 1B are diagrammatic views showing operative conditions of the wire stringing needle and other parts of the mechanism as the bale is being formed;

FIG. 2 is a fragmentary side elevational view of a portion of a baler showing needle mechanism and power driven means therefor;

FIG. 3 is a fragmentary horizontal sectional view taken on the line 3—3 of FIG. 2;

FIG. 5 is an enlarged fragmentary horizontal sectional view taken on the line 5—5 of FIG. 3.

DETAILED DESCRIPTION OF A PREFERRED EMBODIMENT

Figure 4:
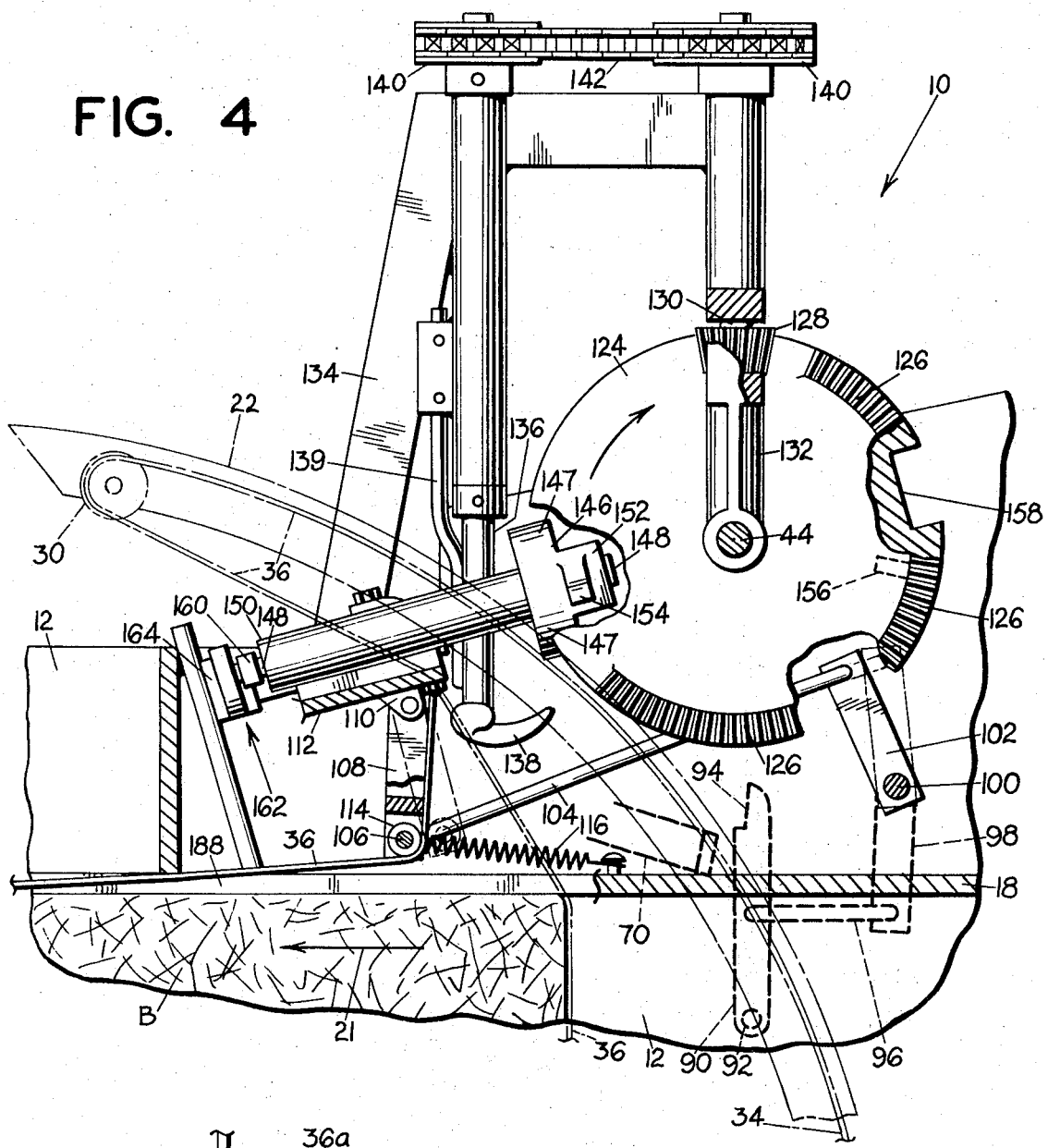
FIG. 4 is a vertical sectional view taken on the line 4—4 of FIG. 3.

The reference numeral 10 designates that portion of a conventional baler where the material is compacted and bales B tied. A baling chamber is formed by side walls 12 and 14, best seen in FIGS. 2 and 3, a bottom wall 16, FIG. 2, and a top wall 18, FIG. 4. A plunger 20, FIG. 1, works in the chamber to compact material. Bales are moved consecutively through the baler in the direction of arrows 21 as they are formed and are discharged through a rearward end of the baler, not shown.

An arcuate needle 22, FIG. 2, is secured on a shaft arm 24 pivotally connected adjacent one end at 26 to the baler. It is general practice to provide more than one wire on a bale, in which case a corresponding number of needles 22 would be provided in suitable lateral spaced relation. Since the mechanism for operating other needles is identical to that shown and described, only one needle and operating means therefor are illustrated herein. A connecting shaft 28 extends laterally to other needle support mechanisms which as stated are not shown.

The free end of needle 22 carries a flanged roller or pulley 30 in a bifurcated end portion 32 thereof and has a groove 34 extending along the outer longitudinal edge thereof. This groove is longitudinally aligned with the flanged roller 30 for receiving one reach of the wire 36 from the roller as the needle swings to an upward position, as shown in phantom lines in FIGS. 2 and 4 and in full lines in FIGS. 1A and 1B. The wire 36 comes from any suitable source, such as a supply roll, not shown, and feeds between a pair of guide rollers 38 mounted on the baler beneath the baling chamber.

Figure 1B:
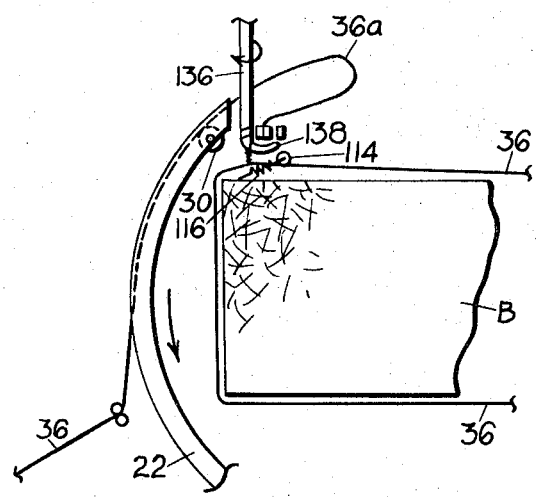

An important feature of the invention is that the needle 22 is constructed of a selected length and can move upward to a position such that in an up-down cycle of the needle a surplus of wire is left at the top in the form of a loop 36a, FIGS. 1 and 1B. More particularly, the needle is of such length and has such upward movement that the loop it leaves is of a length capable of feeding the entire amount of wire necessary along the top of the bale as the latter is formed. In other words, as the bale is formed, the wire along the bottom of the bale comes from the source of wire supply and the wire along the top of the bale comes from the loop 36a, the wire along the rear of the bale, namely, that end which is in abutment with the preceding bale, being stationary and not having to slide between the bales as the latter are formed. The breakage of wire in existing mechanisms usually results from the wire having to slide between the heavily compressed ends of the bale, and since no sliding of wire is necessary in the present mechanism in the area between the bales, breakage will not occur.

To accomplish the above features, the bale length is determined by the amount of wire making up the loop 36a, and thus instead of forming bales by metering the length thereof, the bales are formed by the length of the wire available along the top of the bale, by mechanism now to be described.

With reference to FIG. 2, the needle carrying arm 24 is connected by means of a link bar 40 to an intermittently rotating disc 42 keyed or otherwise secured on a cross shaft 44, also seen in FIGS. 3 and 4. The arrangement is such that each time the disc 42 rotates through one revolution in the direction of arrow 46, FIG. 2, the needle 22 will be swung upwardly (in clockwise direction) to the raised position indicated in broken lines in FIGS. 1A and 2 and then returned to the lower normal rest position. The link bar 40 is pivotally connected between a lever arm 48 on the arm 24 and a lever arm 50 on the disc.

An endless sprocket chain 52, driven continuously from the baler mechanism drives a sprocket wheel 54 rotatably mounted on the shaft 44. This sprocket wheel has a clutch mechanism 56 with a downwardly extending clutch pawl 58, the arrangement being such that when the pawl 58 is disposed in the position shown in FIG. 2 the clutch is released but when this pawl is free of stop mechanism, to be described, it will cause operation of the disc 42.

Control mechanism for operation of the disc 42 and the needle 22 comprises a reset arm 62, FIGS. 2 and 3, extending longitudinally of the machine outside of the baling chamber and having a pivotal connection at a forward end thereof with the upper end of a bell crank lever 64 pivotally connected to the baler by a pivot 66 disposed between the upper and lower ends. One end of a tension spring 68 is connected to the bottom of lever 64 and the other end of this spring is connected to a rearward point on the baler, this spring normally urging the lever 64 in a counterclockwise direction. Lever 64 has a forward arm extension 70 terminating at its forward end in a right angle stop finger 72.

The opposite or rearward end of reset arm 62 has a downturned end portion 74 having gear teeth 76 provided on its forwardly directed edge. A lower portion of the forwardly directed edge has an enlarged notch 78. Teeth 76 and notch 78 are associated with a pinion gear 80 secured on a shaft 82 with a star wheel 84 a bottom portion of which projects into the baling chamber and is caused to rotate in a counterclockwise direction, FIG. 2, as the bales are formed. Thus, as this star wheel is rotated by the bales in a counterclockwise direction, the arm 62 is lifted. It is lifted to the point where the pinion gear 80 disengages from the teeth and is aligned with notch 78. A stop projection 86 is secured on the baler to limit downward movement of the reset arm 62 to the position shown in FIG. 2 as will be more apparent hereinafter.

The mechanism just described comprises a reset for a latch finger 90, FIGS. 2, 3 and 4, pivotally connected at its lower end to the baler by means of a pivot connection 92. The upper end of latch finger 90 has a notch 94, best seen in FIG. 4, adapted to receive the right angle stop 72 on the arm extension 70 of the bell crank lever 64. The parts are dimensioned and arranged such that in the engaging position of the stop 72 on the latch finger 90, the clutch pawl 58 has bearing engagement against the stop 72 and the disc 42 is caused to be stationary.

Release of the latch finger 90 from stop finger 72 results from the takeup of wire on the top of the bale as the latter is formed. For this purpose, a longitudinally extending link 96 is connected at one of its ends to the latch finger 90 intermediate the upper and lower ends of the latter. The other end of the link 96 is connected to the bottom end of a depending lever 98 keyed or otherwise secured on a cross shaft 100 journaled between sides of the baler above the baling chamber. Extending upwardly and integrally from shaft 100 is another lever 102. A connecting link 104 extends rearwardly from the upper end of link 102 and is connected to a projecting end of a shaft 106, FIG. 5, mounted in a bracket 108. This bracket is pivotally connected at its upper end to depending ears 110 on a cross frame member 112 of the baler. Bracket 108 supports a guide roller 114 at its bottom end and such bracket is normally urged toward the front of the baler by a tension spring 116 secured at one of its ends to the shaft 106 and at its other end to a forward point on the top wall 18 of the baling chamber. In a forward position of the bracket 108, the latch finger 90 is engageable with stop 72.

The spring 116 and roller 114 are shown diagrammatically in FIGS. 1, 1A, and 1B, and the arrangement is such that after the loop 36a is used up in the formation of a bale, a slightly further formation of the bale, such as to the condition shown in FIG. 1A, causes the wire 36 to be tensioned. The wire pull on the roller 114 causes the bracket 108 to pivot toward the rear of the machine (clockwise as viewed in FIG. 4). Such movement of the bracket 108 through the medium of link 104, lever 102, and shaft 100, pivots the lever 98 toward the front of the machine (clockwise as viewed in FIG. 2 and counterclockwise as viewed in FIG. 4) to pull the latch finger 90 away from the stop 72. This allows the lever 64 to pivot counterclockwise as viewed in FIG. 2 under the action of spring 68 whereby the stop 72 moves down out of the path of clutch pawl 58. This pivotal movement of lever 64 is controlled by the bottoming of pinion gear 80 in notch 78, the arm 62 having been rotated up relative to the lever 64 to align the notch with the pinion gear by an initial step in the formation of the bale. The disengagement of the clutch pawl 58 from the stop 72 allows the disc 42 to rotate and drive the needle up and down in a wire feeding operation.

As stated hereinbefore, operation of the needle up and down is accomplished by one revolution of the disc 42, and the latter is stopped after one revolution to wait for the formation of the next bale. Resetting of arm 62 to stop the disc 42 after one revolution is accomplished by a cam follower wheel 118, FIGS. 2 and 3, rotatably supported on the upper portion of the bell crank lever 64 and arranged for engagement at selected times with a cam edge 120, FIG. 2, on the disc 42. The arrangement is such that when the arm extension 70 of the lever 64 has dropped, namely, when it is disengaged from the latch finger 90 because of pivotal movement of the latter by the wire tension, this rotation of the lever 64, by spring 68, positions the cam follower wheel forwardly. As the disc rotates to drive the needle, its cam edge 120 engages cam follower wheel 118 to move the reset arm 62 rearwardly against the action of spring 68. This movement is sufficient to cause disengagement of the notch 78 from pinion gear 80, and upon such disengagement, the arm 62 will drop into engagement with the stop projection 86. As the bell crank lever 64 is being rotated clockwise, as viewed in FIG. 2, by the engagement of cam follower wheel 118 by cam edge 120, the arm extension 70 is returned to its upward position and in the path of clutch pawl 58. The disc 42 is thus stopped after one revolution. It is apparent that the star wheel 84 does not control the length of the bale as in existing mechanisms. Instead, its only function is to operate the reset arm 62. The length of the downturned end 74 and the gear ratio thereof is predetermined such that the reset arm 62 is released, namely, the notch 78 moved up into alignment with the gear wheel 80, in an initial bale forming function. The latch finger 90 returns to its functioning position as soon as the pressure is released from the top wire on the bale, namely, as soon as the wire is cut and tied and released from the twister hook. To insure proper engagement of the stop 72 with the notch 94, the latter is cut to an excessive depth, namely to a depth wherein the bottom edge thereof, FIG. 2, is slightly below the bottom of finger 72.

The knotter mechanism for tying the wire is of well known construction and will be described only briefly. It comprises a disc gear 124, FIGS. 3 and 4, having an arcuate bevel gear track 126 extending only part way around the perimeter of the disc gear. This disc gear is secured to shaft 44 so as to rotate in unison with the disc 42. The bevel gear track 126 on the disc gear 124 is engaged by a pinion gear 128 secured on the bottom of a vertical shaft 130. This shaft is rotatably supported in a hanger 132 secured on the top of the baler by a support arm 134. Hanger 132 supports a vertical twister hook shaft 136 having a twister hook 138 secured to the bottom end thereof. Such shaft also supports a pressure finger 139 engageable longitudinally with the shaft and terminating at its lower end adjacent the twister hook for assisting the hook in a tying operation in a well known manner. Shafts 130 and 136 have sprocket wheels 140 on their upper ends connected by sprocket chain 142.

The disc gear 124 has a flange 144 on its side opposite from the gear teeth 126, and this flange is associated with a drive head 146 secured on a shaft 148 journaled in a sleeve 150 secured to the cross frame member 112. The drive head 146 has laterally extending projections 147 and a forward extension 152 which projects behind the flange 144. Such extension has a pair of ears 154 in a diametrically opposed relation and located 90° around from the projections 147. These ears are adapted for engagement by a projection 156 integral on disc gear 124 and disposed behind the flange 144. The disc gear has an edge notch 158 adjacent to the projection 156 which is adapted to accommodate the head 146 as the disc rotates. As the disc gear 124 rotates through one revolution, one of the ears will ultimately be engaged by the projection 156. This will rotate the head enough to place a projection 147 in the edge notch 158. Further rotation of the disc gear will therefore continue driving rotation of the head 146. As the head leaves the notch 158, a 180° rotation of the shaft 148 will have been accomplished.

The opposite end of shaft 148 from the head 146 has a cam roller 160 thereon having a scotch yoke connection 162 with a throw bar 164. This bar has an adjusting abutment screw connection 166 with a gripper tongue 168. Gripper tongue 168 has a pivot connection 170 intermediate its ends to the cross frame member 112 and has a front lateral slot 172, FIG. 5, which forms a wire receiving opening on the opposite sides. The bottom lateral edges 174 at each side adjacent the front of the gripper tongue, namely, below the opening 172, comprise cutting edges and the side surfaces 176 above the opening comprise holding surfaces. The gripper tongue cooperates with an anvil 178 secured to the cross frame 112, as by bolts 180. This anvil has an opening 182 in which the gripper tongue works laterally. The vertical defining walls of this opening have a pair of projections 184 which cooperate with the slot 172 and side surfaces 176 of the gripper tongue to assist in holding the wire in the manner shown in FIG. 5. The anvil 178 also has a pair of projections 186 the top edges of which form shearing edges with the edges 174 of the gripper tongue.

The needle 22 operates through a slot 188 in the upper wall of the baling chamber, FIG. 3, and the bottom wall of the baling chamber has a similar slot, not shown, for the needle. The needle is arranged to lay the wire in the cutting and gripping mechanism in a well known manner which by cooperation with the twister hook 138 and pressure finger 139 causes the wire to be twisted into a knot by the hook. The gripper tongue 168 cooperates alternately with opposite sides of the anvil opening 182 for successive knot forming operations. Such alternate movement is accomplished by operation of crank 160 by gear 124, and as such gripper tongue is repositioned, the needle lays the wire alternately on opposite sides thereof. The two positions of operation are shown in full and phantom lines in FIG. 5. The wire in the full line designation on the left side of the gripper and cutter has been cut and one end thereof is being held. The central designation of the wire in phantom lines comprises a portion which extends around the bale. This latter wire at the proper time will be engaged, together with the gripped end, by the twister hook and a knot formed therein. The wire shown at the right in phantom lines designates the next position of the wire in the gripper and cutter for the next bale.

In the operation of the present mechanism, the bales are formed continuously one after another by the plunger 20 and moved through the baling chamber. As stated hereinbefore, the needle 22 has a length and an upward movement such that it forms the enlarged loop 36a of excess wire at the top, and such loop contains substantially precisely the length of wire equal to the length of the bale desired or possibly a few inches less since the wire will embed itself in the ends of the bale. FIG. 1B shows the loop 36a just formed by the needle and the needle started down and FIG. 1 shows a bale starting to be formed. FIG. 1A shows the bale completed wherein the loop 36a has been depleted and the wire on top of the bale is exerting tension against roller 114. This moves the roller rearwardly to unlatch finger 90 from stop 72 on the bell crank lever 64. Since the reset arm 62 has been driven upwardly in an initial portion of the bale forming operation to align the gear 80 with the notch 78, the bell crank lever 64 can now rotate counterclockwise an amount sufficient to clear the clutch pawl 58. The disc 42 will rotate to drive the needle up in its next wire laying operation. As such disc is making its revolution, its cam edge 120 engages the cam follower wheel 118 to reset the bell crank lever so that the stop finger 72 is in the path of the clutch pawl and the disc will be stopped after one revolution. After the knot has been formed and tension has been released from the wire along the top of the bale, the roller 114 returns to its normal position under the action of spring 116 and latch finger 90 thus positions itself under the stop 72 to hold the drive means for the needle and gripping and tying means inoperative until the proper time is determined by the outlet of wire from the loop 36a.

The present invention thus eliminates any pulling tension to the wire which may exist in the area between bales, thus preventing breakage of the wire which has heretofore resulted from the wire having to be pulled through the tight area between said bales. Tighter bales can thus be formed and the wire that is used can be of minimum gauge size.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A bale forming and tying mechanism comprising
   a. a frame,
   b. a baling chamber on said frame with a material receiving entrance and a reciprocating piston for compacting bales in end to end relation and forcing them through the baling chamber,
   c. a supply source of bale tying wire,
   d. a wire carrying needle on said frame,
   e. power driven means on said frame causing the needle to move up and down at intervals through the baling chamber,
   f. wire tying means on said frame,
   g. said needle being arranged to carry wire upwardly for placing it in said wire tying means and having an upward movement above said baling chamber sufficient to leave a loop of wire above the baling chamber of a total length equivalent to substantially the length of a bale,
   h. and control means for controlling the operation of said power driven means for the needle,
   i. said control means comprising a movable linkage engageable by the wire and releasable by tightening movement of the wire after the loop is depleted.

2. The bale forming and tying mechanism of claim 1 wherein said power driven means includes a rotatable disc assembly, a lever arm on said disc assembly connected to said needle for causing up and down movement of the needle as said disc assembly is rotated, and a stop projection on said disc assembly; said movable linkage including a movable latch member, said control means also including reset means arranged for engagement with said latch member, said reset means controlling operation of said latch member and being operated by linear movement of said bale.

3. The bale forming and tying mechanism of claim 1 wherein said power driven means includes a rotatable disc assembly, a lever arm on said disc assembly connected to said needle for causing up and down movement of the needle as said disc assembly is rotated, and a stop projection on said disc assembly; said movable linkage including a movable latch member, said control means also including a reset arm connected to said movable linkage, a metering wheel on said baler having a portion thereof projecting into the baling chamber for rotation by linear movement of a bale in such chamber, and a drive connection between said metering wheel and said reset arm whereby upon rotation of the metering wheel by the movement of a bale the reset arm is driven to a position allowing release of said movable linkage.

4. The bale forming and tying mechanism of claim 1 wherein said power driven means includes a rotatable disc assembly, a lever arm on said disc connected to said needle for causing up and down movement of the needle as said disc assembly is rotated, and a stop projection on said disc assembly; said movable linkage including a movable latch member, guide means operably connected to said movable latch member, said control means also including reset means arranged for engagement with said latch member, said reset means controlling operation of said latch member and being operated by linear movement of said bale, said guide means being arranged to be engaged by the wire extending from the loop to one side of the bale and being movably mounted and arranged to release said latch member from said reset means upon tension being applied to the wire.

5. The bale forming and tying mechanism of claim 1 wherein said control means also includes reset means controlling operation of said movable linkage and operated by linear movement of said bale and by said power driven means.

6. The bale forming and tying mechanism of claim 1 wherein said control means also includes a reset arm connected to said movable linkage, said reset arm being arranged to be driven to a position allowing release of said movable linkage by linear movement of said bale.

* * * * *